(12) United States Patent
Spangler et al.

(10) Patent No.: US 9,015,456 B1
(45) Date of Patent: Apr. 21, 2015

(54) INDICATOR FOR DEVELOPER MODE

(75) Inventors: Randall R. Spangler, San Jose, CA (US); William F. Richardson, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 421 days.

(21) Appl. No.: 13/246,800

(22) Filed: Sep. 27, 2011

(51) Int. Cl.
 *G06F 15/177* (2006.01)
 *G06F 21/57* (2013.01)
 *G06F 9/44* (2006.01)
 *G06F 21/62* (2013.01)

(52) U.S. Cl.
 CPC .............. *G06F 21/575* (2013.01); *G06F 21/62* (2013.01); *G06F 9/4403* (2013.01)

(58) Field of Classification Search
 CPC ............. G06F 3/00; G06F 5/00; G06F 21/00; G06F 21/57; G06F 21/74; G06F 21/575; G06F 21/62; G06F 9/4403
 USPC .................................. 713/1, 2; 726/2; 711/100
 See application file for complete search history.

(56) References Cited

U.S. PATENT DOCUMENTS

| | | | |
|---|---|---|---|
| 7,117,352 B1 * | 10/2006 | Giles et al. .......................... | 713/2 |
| 7,484,241 B2 * | 1/2009 | Challener et al. .................. | 726/5 |
| 7,827,326 B2 * | 11/2010 | Bosch et al. ..................... | 710/36 |
| 2004/0176068 A1 * | 9/2004 | Paatero .......................... | 455/410 |
| 2005/0033969 A1 * | 2/2005 | Kiiveri et al. .................. | 713/189 |
| 2005/0228980 A1 * | 10/2005 | Brokish et al. ..................... | 713/2 |
| 2007/0226795 A1 * | 9/2007 | Conti et al. ..................... | 726/22 |
| 2007/0283146 A1 * | 12/2007 | Neveux .......................... | 713/166 |
| 2010/0062833 A1 * | 3/2010 | Mattice et al. .................. | 463/24 |
| 2010/0231827 A1 * | 9/2010 | Yamashita et al. .............. | 349/65 |
| 2011/0032580 A1 * | 2/2011 | Yi ................................. | 358/406 |

* cited by examiner

*Primary Examiner* — Fahmida Rahman

(74) *Attorney, Agent, or Firm* — McDermott Will & Emery LLP

(57) ABSTRACT

A dual-mode computing system and machine-implemented method for providing an indication of an operating mode of the system. The system including a processor, a memory storing verified code, a secure memory coupled to a processor and a developer mode indicator coupled to the secure memory, wherein the processor is configured to execute verified code to perform operations comprising initiating boot up of the system. The operations further comprising accessing a developer mode state stored within the secure memory to determine whether the system is in developer mode, wherein the developer mode allows the system to execute unverified code, activating the developer mode indicator when it is determined that the system is in developer mode and locking the secure memory to ignore subsequent calls to modify the developer mode state when it is determined that the system is in developer mode.

21 Claims, 6 Drawing Sheets

INDICATOR FOR DEVELOPER MODE

BACKGROUND

The present disclosure generally relates to systems, and more particularly to a dual mode system.

A system may operate in two operating modes, a normal mode where the system runs verified code and a developer mode where the system may run unverified, unsigned or user-signed code, allowing the developer to run their own code and/or operating system.

When the system is operating in developer mode, certain verified boot features, such as security functionalities available to the user in normal mode, may be disabled to allow the user to run their own unverified code. Accordingly, in developer mode a user may be exposed to security threats. Thus, it may be desirable that the user be made aware of being in developer mode.

SUMMARY

The disclosed subject matter relates to a dual-mode computing system comprising a processor, a memory coupled to the processor, the memory configured to store verified code, a secure memory coupled to the processor and a developer mode indicator coupled to the secure memory, wherein the processor is configured to execute the verified code to perform operations comprising initiating boot up of the system. The operations further comprising accessing a developer mode state stored within the secure memory to determine whether the system is in developer mode, wherein the developer mode allows the system to execute unverified code. The operations further comprising activating the developer mode indicator when it is determined that the system is in developer mode. The operations additionally comprising locking the secure memory, such that the secure memory ignores subsequent calls to modify the developer mode state when it is determined that the system is in developer mode.

The disclosed subject matter also relates to a machine-implemented method for providing an indication of an operating mode of a system, the method comprising executing verified code to perform the steps comprising initializing boot up of the system. The steps further comprising accessing an operating mode state stored within a secure memory to determine whether the system is in a first operating mode. The steps additionally comprising activating an operating mode indicator when it is determined that the system is in the first operating mode. The steps further comprising locking the secure memory, such that the secure memory ignores subsequent calls to modify the operating mode state when it is determined that the system is in the first operating mode. The method further comprising enabling execution of unverified code after locking the secure memory.

The disclosed subject matter also relates to a machine-readable medium comprising instructions stored therein, which when executed by a machine, cause the machine to perform operations comprising executing verified code to perform the steps comprising initializing boot up of the system, accessing a developer mode state stored within an internal register to determine whether the system is in developer mode, wherein developer mode allows the system to execute unverified code, activating a developer mode indicator when it is determined that the system is in developer mode and locking the internal register, such that the internal register ignores subsequent calls to the internal register when it is determined that the system is in developer mode. The operations further comprising enabling execution of unverified code to boot the system in developer mode after locking the internal register, when it is determined that the system is in developer mode.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The present system provides the user with an indication of an operating mode of the system. The system may operate in two operating modes, to provide software developers with the ability to run their own code. In a first normal mode, the system runs verified code. As used herein, "verified code" refers to code, such as verified firmware, operating system or boot image, which has been signed by a trusted party (e.g., a computer manufacturer). At some time during operation in normal mode, the user of the system may cause the system to switch to developer mode (e.g., by activating a physical developer switch or pressing a key combination on a keyboard). In developer mode, the system may run unverified code. As used herein, "unverified code" refers to any code other than verified code, including unsigned or user-signed code.

Upon enabling developer mode, verified boot features may be disabled, allowing the user to run unverified code. The verified boot features may include security measures typically performed by the system when running in normal mode to protect the user from security threats. While running developer mode an attacker may enter the system and run unverified code that may make the system appear as it would in normal mode, without the knowledge of the user. Thus, the user may not be aware that the system is running in developer mode, where the system is exposed to threats from unauthorized sources (e.g., an attacker). The user should accordingly be made aware of entering and operating in developer mode, and thus disabling verified boot features. In one aspect during boot time, a warning screen may be presented to the user notifying the user the system is running in developer mode. However, if the user misses the boot time warning, or is not present at boot time, the user may not be aware that the system is running in developer mode.

Accordingly, the present system provides a developer mode indicator (e.g., an LED developer mode indicator) that can be activated for the duration that the system is running in developer mode such that the user is aware of the mode of operation of the system even if the user missed the boot time warning.

Figure 1:
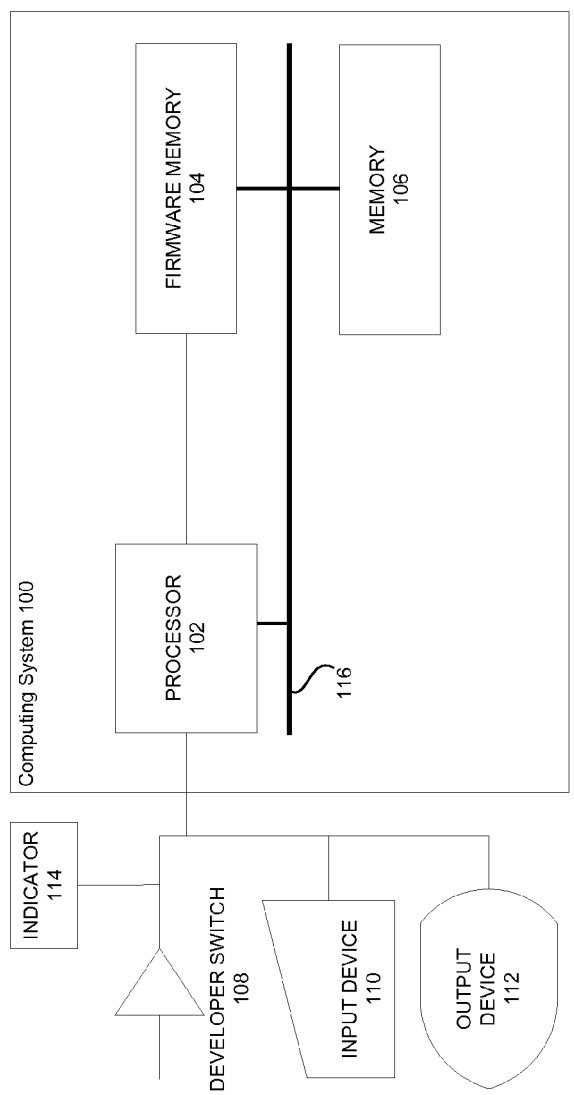
FIG. 1 illustrates a block diagram illustrating an exemplary system according to certain aspects of the disclosure.

FIG. 1 is a block diagram illustrating an exemplary system 100 having a developer mode indicator according to certain aspects of the disclosure. The system 100 includes a processor 102, a firmware memory 104, a memory 106, a developer switch 108, an input device 110 (e.g., a keyboard), an output device 112 (e.g., a display) and a developer mode indicator 114 and a bus 116. Bus 116 collectively represents all system, peripheral, and chipset buses that communicatively connect the numerous internal devices of electronic system 100. For instance, bus 116 may communicatively connect processor 102 with firmware memory 104 and memory 106.

In certain aspects, the firmware memory 104 and memory 106 may reside within a single memory storage device or on one or more separate memory storage devices. Firmware memory 104 and memory 106 can be or include non-volatile memory, such as a readable and writeable storage device. Memory 106 may store code, including verified and unverified code, for running the system in normal mode or developer mode. The firmware memory 104 may store one or more firmware for initializing boot up of the system in normal or developer mode. Firmware memory 104 may be or include the firmware memory shown in FIG. 3, described in more detail below.

The processor 102 is configured to execute instructions, such as instructions physically coded into the processor 102, instructions received from software in firmware memory 104 or memory 106, or a combination thereof. For example, the processor 102 may execute instructions from firmware residing in firmware memory 104 to initialize boot up and select the appropriate code (e.g., a developer boot image or normal mode boot image stored in memory 106) depending on the state of the developer switch 108.

The developer switch 108 may include a physical switch connected to a switch circuit for switching between the two operating modes of the system. The developer mode indicator 114 may include a physical indicator such as an LED indicator placed on a casing of a computing device housing the system 100 or as a displayable warning presented in a persistent manner on an output device 112 (e.g., a display). The developer mode indicator 114 may be controlled by being hardwired to the developer switch 108. In one aspect the developer mode indicator 114 may be further coupled to the main power, such that when the system is in developer mode and the system is turned on the developer mode indicator 114 may be activated (e.g., the LED developer mode indicator may be lit).

The developer mode indicator 114 provides the user with a persistent notice that the system is running in developer mode. Since the developer mode indicator 114 is wired to an actual hardware switch, an unauthorized developer (e.g., attacker) cannot modify the state of the developer mode indicator. However, the use of the physical developer switch may be undesirable in that it requires extra hardware to be added to the system to enable supporting dual mode operation.

Figure 2:
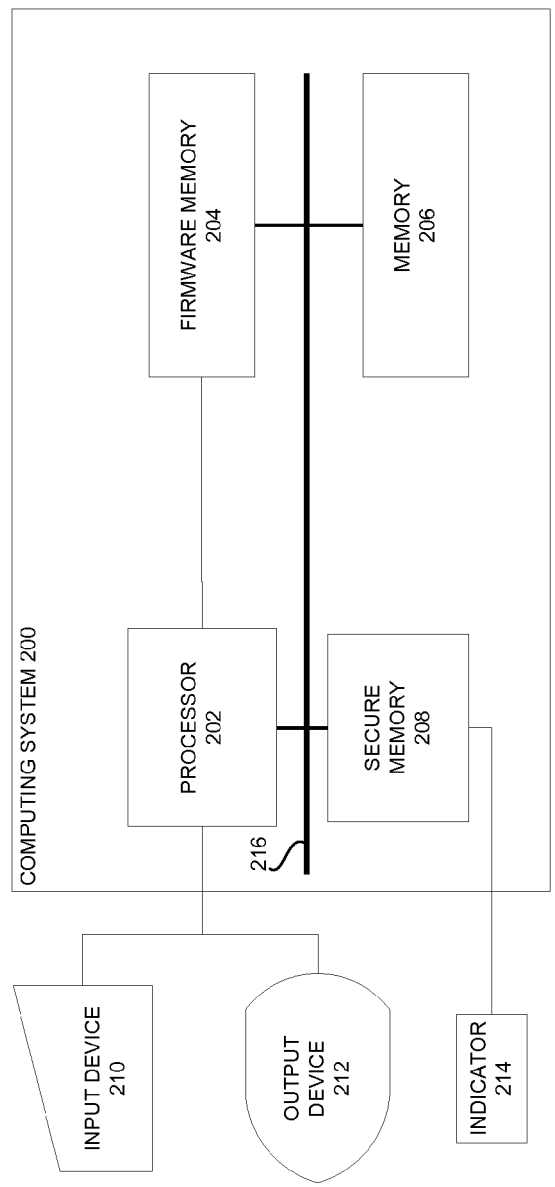
FIG. 2 illustrates a block diagram illustrating an alternative exemplary system according to certain aspects of the disclosure.

FIG. 2 illustrates a block diagram illustrating an alternative exemplary system 200 according to certain aspects of the disclosure. The system 200 may enable choosing the mode of operation without requiring an actual hardware developer switch (e.g., using keyboard control).

The system 200 includes a processor 202, a firmware memory 204, a memory 206, a secure memory 208, an input device 210 (e.g., a keyboard), an output device 212 (e.g., a display) and a developer mode indicator 214 and a bus 216. Bus 216 collectively represents all system, peripheral, and chipset buses that communicatively connect the numerous internal devices of system 200. For instance, bus 216 may communicatively connect processor 202 with firmware memory 204, memory 206 and secure memory 208. The system 200 may further include a physical developer switch.

The firmware memory 204 and memory 206 may reside within a single memory device or on one or more separate memory devices. Firmware memory 204 and memory 206 can be or include non-volatile memory, such as a readable and writeable storage device. Memory 206 may store one or more sets of verified or unverified code for operating the system in normal or developer mode.

Figure 3:
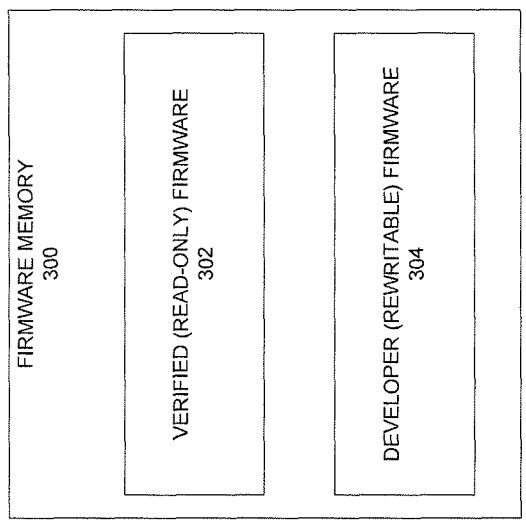
FIG. 3 illustrates a block diagram of an exemplary firmware memory of the system of FIGS. 1 and 2.

The firmware memory 204 may include firmware for initializing boot up of the system. For example, the firmware memory 204 may be or include the firmware memory shown in FIG. 3. FIG. 3 is a block diagram illustrating an exemplary firmware memory of the systems of FIGS. 1 and 2. The firmware memory 300 may include verified firmware 302 (e.g., read-only firmware) for initializing boot-up and/or booting the system in normal mode, and developer firmware 304, (e.g., rewritable firmware) that may run when the system is operating in developer mode. In one aspect, when the system begins boot the verified firmware 302 begins the boot process and after determining that the system should be operating in developer mode (e.g., the developer switch is turned on), may pass control to developer firmware 304 for booting the system in developer mode. Alternatively, firmware memory 204 may include a single verified firmware for booting the system in both safe and developer mode.

The processor 202 is configured to execute instructions, such as instructions physically coded into the processor 202, instructions received from software in firmware memory 204 or memory 206, or a combination thereof. For example, the processor 202 may execute instructions from a firmware residing in firmware memory 204 to select and process an appropriate verified or unverified set of code (e.g., a developer boot image or normal mode boot image stored in memory 206), to operate the system in normal or developer mode, depending on a developer mode state stored within secure memory 208.

The secure memory 208 may include a Trusted Platform Module (TPM) chip or other memory circuit providing lockable or protectable storage (e.g., an internal register accepting instructions for ignoring read/write calls). The secure memory 208 may store a developer mode state (e.g., having a value of one or zero) that controls whether the computing device is in developer mode. The value of the developer mode state may be set to one when the developer mode is enabled and zero when the developer mode is disabled. The developer mode indicator 214 may include a physical indicator such as an LED indicator placed on the body of the device housing the system 100 or presented in a persistent manner on an output device 112 (e.g., a display). The developer mode indicator 214 may be coupled to the secure memory 208 and/or processor 202, such that the state of the developer mode indicator 214 mirrors the developer mode state stored within the secure memory 208.

For example, the secure memory 208 may comprise a TPM chip. TPM chips have General Purpose Input Output (GPIO) lines which mirror the state of an internal register of the TPM. The internal register may be used to hold the developer mode state, and the GPIO line representing this state can be used to control the developer mode indicator 214. In one aspect, when the value of the developer mode state is enabled (e.g., equal to one), a signal (e.g., a high power signal) may be sent to the developer mode indicator 214 through the GPIO lines to activate the developer mode indicator 214.

Since the developer mode indicator 214 is controlled using the developer mode state written to secure memory 208 (e.g., to an internal register of a TPM chip), the value of the developer mode state and thus the state of the developer mode indicator should be protected from being falsely modified (e.g., to turn off the developer mode indicator 214 when running in developer mode) by an unauthorized developer while the system is executing unverified code in developer mode. To prevent unauthorized modification of the state of the developer mode indicator 214, the system 200 may protect the value of the internal register at boot time before turning control over to unverified code being run while the system is in developer mode.

According to one instance, the processor 202 may initially execute the verified firmware stored within the firmware memory 204; the verified firmware may read the value of the developer mode state stored within the secure memory 208 to control the developer mode indicator 214. Once the value of the developer mode state is read from secure memory 208, the verified firmware may issue a command to the secure memory 208 (e.g., to the internal register of the TPM) to lock the secure memory 208. The call may cause the secure memory 208 to ignore all future read/write calls to the secure memory to modify the value of the developer mode state. The command to ignore all future read/write calls may persist until the system reboots. Once the command is sent to the secure memory 208, the system may begin running in developer mode (e.g., turning control over to developer firmware and/or enabling execution of unverified code). Accordingly, while the system 200 is running unverified code, the secure memory 208 ignores any calls made to modify the value of the developer state mode. The command to ignore calls may persist until the system is rebooted, at which time the verified firmware will again be in control and can protect the state of the developer mode state from unauthorized modification.

Figure 4:
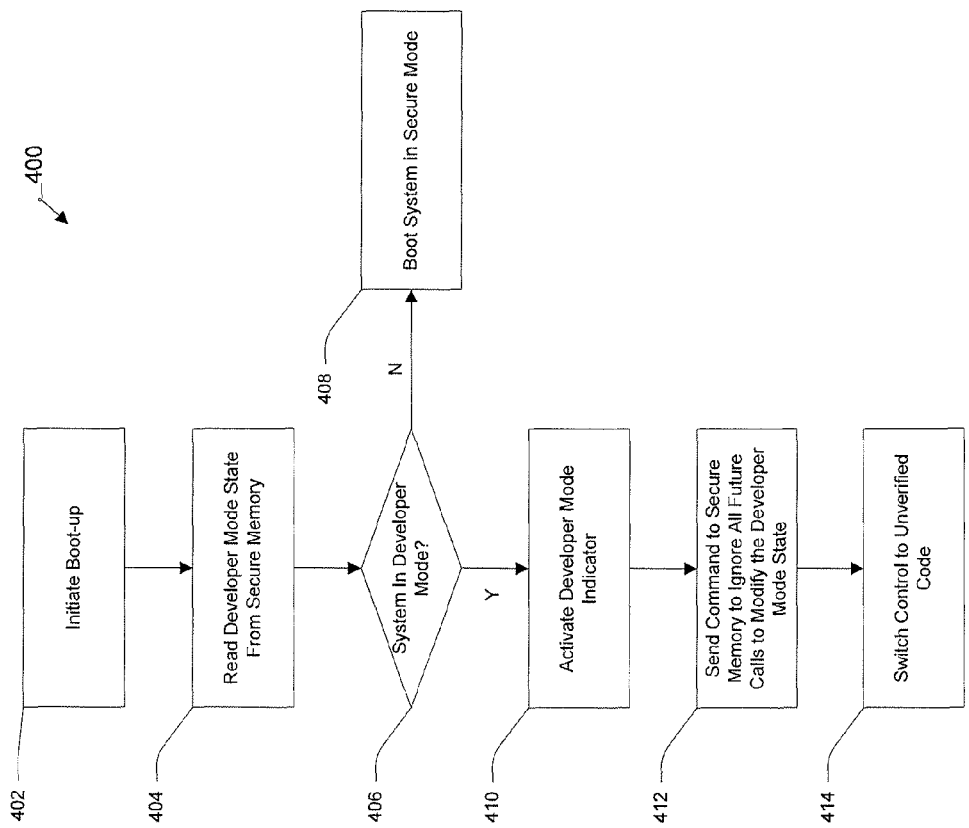
FIG. 4 illustrates an exemplary process for providing an indication of an operating mode of the system of FIG. 2.

FIG. 4 illustrates an exemplary process 400 for providing an indication of an operating mode of the system of FIG. 2. In step 402, the system initiates boot-up by executing verified code. For example, the processor 202 may load the verified firmware stored within the firmware memory 204. The processor 202 executing the verified code (e.g., verified firmware) is configured to determine whether the system should be booted in normal mode or developer mode. Executing the verified code (e.g., verified firmware), processor 202 may determine that developer mode has been enabled based on input received at input device 110 (e.g., through keyboard control) or by modifying a physical developer switch. Upon detecting that developer mode is enable, the processor 202 may write the value of the developer mode state in secure memory 208 (e.g., at an internal register of a TPM chip) to reflect the developer mode being enabled (e.g., the value of the developer mode state is set to one). Alternatively, if the processor determines that the system is in normal mode, processor 202, executing verified firmware, may write the value of the developer mode state to secure memory 208 to reflect that the system is operating in normal mode (e.g., the value of the developer mode state is set to zero).

In one aspect, the developer mode state value in secure memory 208 may persist across power cycles, such that the developer mode does not have be re-enabled each time the device is booted. Accordingly, once the developer mode is enabled (e.g., the developer mode state value is set to one) the system will run in developer mode until the developer mode is disabled (e.g., the developer mode state value is set to zero).

Next in step 404, the processor reads the value of the developer mode state from secure memory 208. In step 406, it is determined whether the system should be booted in developer mode based on the value of the developer mode state. If, in step 406, the processor determines that the system should run in normal mode (e.g., the developer mode state value is set to zero), in step 408, the verified firmware instructs the processor 202 to load verified code, including a verified boot image or operating system, from memory 206 and boot the system in normal mode.

Otherwise, if in step 406 the processor determines that the system should run in developer mode (e.g., the value of the developer mode state is set to one), in step 410, developer mode indicator 214 is activated (e.g., the LED indicator is lit). Next, in step 412, a command is issued to secure memory 208 (e.g., to the internal register storing the developer state mode) to ignore all future read/write calls regarding the value of the developer mode state. Once the value of the developer mode state has been locked, in step 414, control is switched to unverified code (e.g., developer firmware) and the system boots in developer mode so that the user (e.g., developer) may run their own unsigned or user-signed code. The value of the developer mode remains locked until the device is rebooted, at which time the system will initiate boot-up using the verified code. Thus, the value of the developer mode, and the state of the developer mode indicator, may be protected against unauthorized modification.

Figure 5:
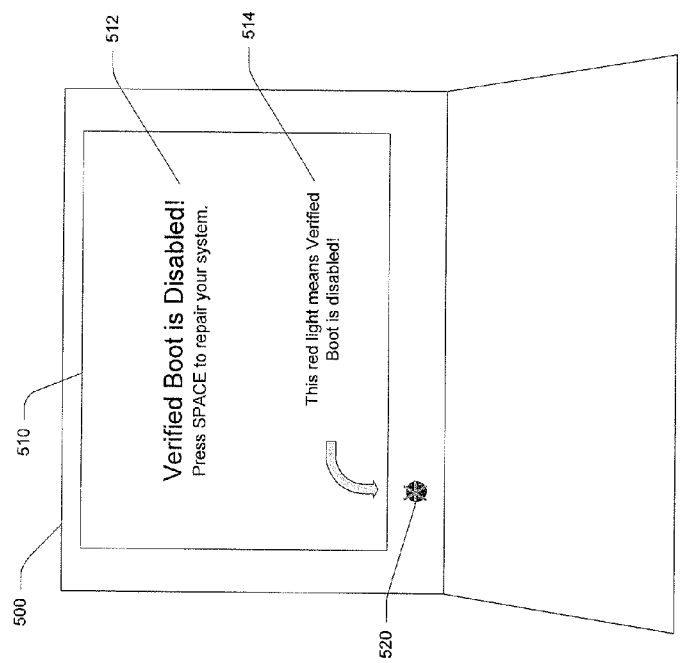
FIG. 5 illustrates an exemplary computing device displaying a boot time message and a developer mode indicator.

Once the system begins booting in developer mode a warning message may be displayed to the user at boot time. In one aspect, the warning message may include a message to the user (e.g., developer mode indicator 114 or 214) indicating the significance of the developer mode indicator. FIG. 5 illustrates an exemplary computing device 500 displaying a boot time message and a developer mode indicator. The computing device 500 may be the computing device housing the system 100 or system 200) includes a display 510 and a developer mode indicator 520. The display 510 may display a message 512 (e.g., at boot time) alerting the user that the verified boot is disabled when the system is running in developer mode. Additionally, the display 510 may further display a message 514 providing informing the user that the activation of the LED indicator 520 means that the verified boot is disabled (i.e., the system is running in developer mode).

Similarly, to apprise the user of the significance of the developer mode indicator, the indicator may be presented in a specific configuration. For example, where the developer mode indicator is an LED indicator, the LED may be placed behind a partially transplant element on the casing of the computing device housing the system (e.g., system 100 or 200), so that the developer mode indicator appears in a specific manner (e.g., displaying a shape or text). Additionally, the LED developer mode indicator may be coupled to additional circuitry such that it may blink periodically to keep the user alert that the system is running in developer mode.

The developer mode indicator may further be coupled to an Automatic Light Sensor (ALS) of the system (e.g., system 100 or 200) to enable control of the brightness of the developer mode indicator (e.g., LED indicator). In this manner, the brightness of the LED developer mode indicator may be adjusted to be bright when the system is operated in a bright environment (e.g., office or outdoors) and dimmed when the system is operating in a dark environment (e.g., a dark room). Similarly the LED developer mode indicator may be coupled to the backlight control circuit of the internal LCD display of the computing device housing the system, such that the brightness of the LED developer mode indicator matches the brightness of the internal LCD display (e.g., the LED developer mode indicator is dimmest when the back light of the display is turned off, and brightest when the display backlight is turned on). Where an additional display is attached, additional circuitry may be coupled to the LED developer mode indicator to enable control of the brightness of the LED developer mode indicator based upon the brightness of the external controller.

While the developer mode indicator (e.g., developer mode indicator 114 or developer mode indicator 214) is herein described as a dedicated indicator, in one aspect the developer mode indicator may be multiplexed with an existing indicator (e.g., a battery, power or keyboard indicator). For example, a multiplexed LED indicator may display a first color when power is low and system is running in normal mode, a second color when power is above a threshold and system is running in developer mode, and a third color when power is low and system is running in developer mode. To ensure that the code controlling the state of the multiplexed indicator (e.g., the color of the LED indicator) cannot be modified by an unauthorized developer while the system is running unverified code in developer mode, the code controlling the multiplexed indicator may be read-only code or verifiable code.

In one aspect, the system may include an embedded controller that controls keyboard, power, battery and/or other existing indicators. In one aspect, the state of the developer mode indicator may similarly be stored at the embedded controller or may be read at boot time from the physical developer switch 108 or secure memory 208 by the embedded controller. The state of the power, battery or keyboard and the developer mode indicator state may then be used to determine a state of the multiplexed indicator.

In one aspect, at boot time, the system (e.g., system 100 or system 200) may verify the code executed at the embedded controller before turning control over to unverified code. The system may then allow the main processor (e.g., processor 102 or 202) to run unverified code, but the embedded controller will only run verified code. In this manner, the embedded controller may control the color of the multiplexed indicator. The blinking of the developer mode indicator or multiplexed indicator may similarly be controlled by the embedded controller. Similarly, the brightness of the developer mode indicator or multiplexed indicator (e.g., LED indicator) may be similarly controlled using the embedded controller.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
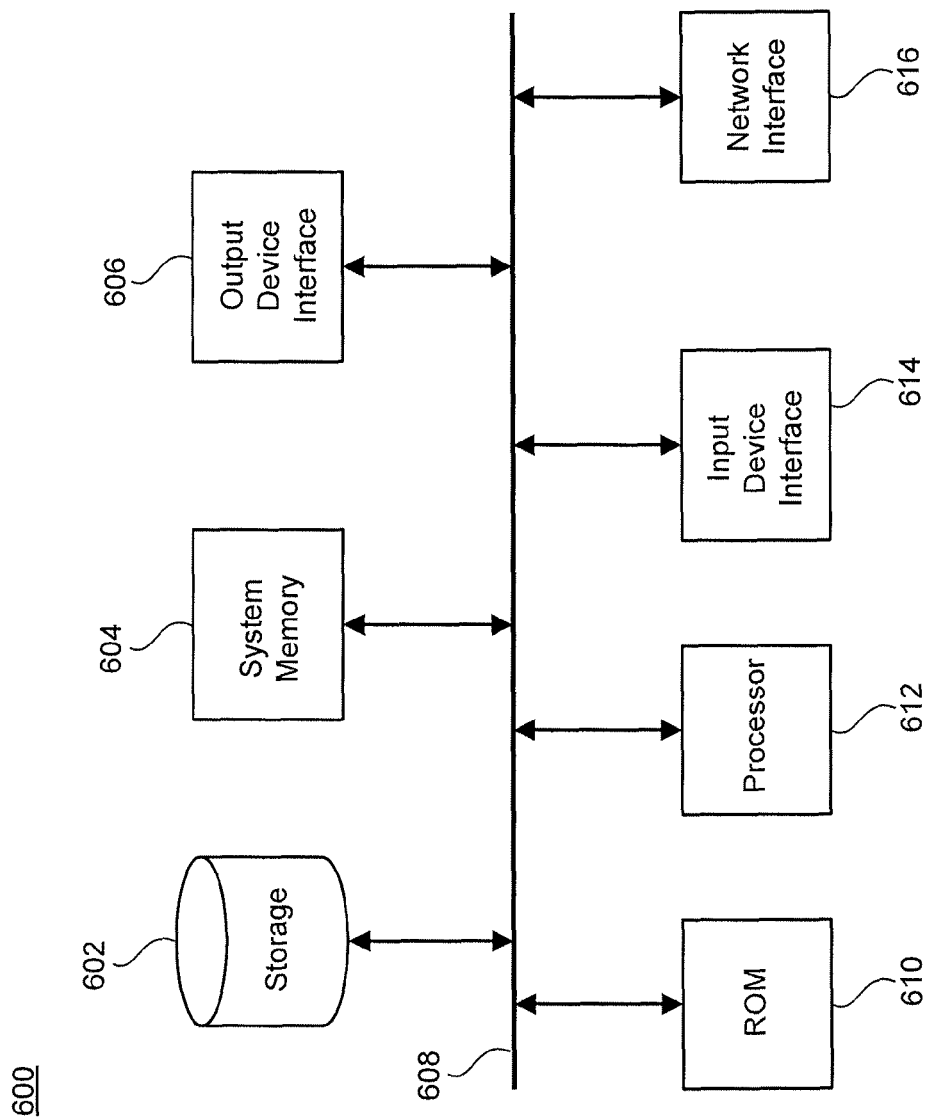
FIG. 6 conceptually illustrates an electronic system with which some implementations of the subject technology are implemented.

FIG. 6 conceptually illustrates an electronic system with which some implementations of the subject technology are implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for processing multimedia items in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A dual-mode computing system comprising:
   a processor;
   a memory coupled to the processor, the memory configured to store verified code;
   a secure memory coupled to the processor; and
   a developer mode indicator coupled to the secure memory;
   wherein the processor is configured to execute the verified code to perform operations comprising:
      initiating boot up of the system;
      accessing a developer mode state stored within the secure memory to determine whether the system is in developer mode, wherein the developer mode allows the system to execute unverified code;
      instructing the secure memory to activate the developer mode indicator when it is determined that the system is in developer mode based on the developer mode state stored in the secure memory, wherein the activation of the developer mode indicator provides indication that the system is allowed to execute unverified code; and
      locking the secure memory, such that the secure memory ignores subsequent calls to modify the secure memory while the system is allowed to execute unverified code until the system is rebooted; and
   wherein the secure memory is configured to send a signal directly to the developer mode indicator to activate the developer mode indicator.

2. The system of claim 1, wherein the secure memory comprises a Trusted Platform Module (TPM) chip having an internal register and wherein the developer mode state is stored within the internal register of the TPM.

3. The system of claim 2, wherein the TPM comprises one or more General Purpose Input/Output (GPIO) lines, and wherein activating the developer mode indicator comprises sending the signal to activate the developer mode indicator through the GPIO lines of the TPM.

4. The system of claim 1, wherein the developer mode indicator comprises an LED indicator.

5. The system of claim 4, further comprising an automatic light sensor coupled to the developer mode indicator, enabling control of the developer mode indicator based on an ambient light level.

6. The system of claim 4, further comprising a backlight control circuit for controlling a display coupled to the processor, the backlight controller circuit being further coupled to the developer mode indicator, enabling control of the developer mode indicator based on a brightness of the system display.

7. The system of claim 4, further comprising circuitry configured to cause the developer mode indicator to blink periodically while the system is in the developer mode.

8. The system of claim 1, wherein the developer mode indicator comprises a multiplexed indicator, wherein the multiplexed indicator is configured to indicate the operating mode of the system and a second state of the system different from the operating mode simultaneously.

9. The system of claim 8, wherein the second state of the system comprises one of a keyboard state, a power state and a battery state of the system.

10. The system of claim 8, further comprising:
   an embedded controller configured to execute a second set of verified code to control the state of the developer mode indicator based on activating the developer mode indicator and the second state of the system.

11. The system of claim 1, the memory further storing unverified code,
   wherein the operations further comprise executing the unverified code after locking the secure memory.

12. The system of claim 1, wherein the memory comprises a firmware memory storing verified firmware, wherein the initiating boot up of the system comprises executing the verified firmware at the processor.

13. The system of claim 1, the operations further comprising displaying a developer mode warning to a user of the system when it is determined that the system is in the developer mode.

14. The system of claim 1, further comprising a display, wherein activating the developer mode indicator comprises a warning being displayed on the display while the system is in the developer mode.

15. A machine-implemented method for providing an indication of an operating mode of a system, the method comprising:
   executing verified code to perform the steps comprising:
      initializing boot up of the system;
      accessing an operating mode state stored within a secure memory to determine whether the system is in a first operating mode, the operating mode state providing an indication of whether the system is in a first operating mode during which the system is enabled to execute unverified code or an operating mode different from the first operating mode in which the system is not enabled to execute unverified code;
      activating an operating mode indicator when it is determined that the system is in the first operating mode, wherein the activation of the operating mode indicator is directly controlled by the secure memory by sending a signal directly to the operating mode indicator based on the operating mode state stored within the secure memory;
      locking the secure memory, such that the secure memory ignores subsequent calls to modify the secure memory, when it is determined that the system is in the first operating mode; and
   enabling execution of unverified code after locking the secure memory, wherein the secure memory ignores all calls to modify the secure memory while the system is enabled to execute unverified code, until the system reboots.

16. The method of claim 15, further comprising booting the system using verified code when it is determined that the system is not in the first operating mode, wherein the system is not enabled to run unverified code when the system is not in the first operating mode.

17. The method of claim 15, the steps further comprising displaying a warning to a user of the system when it is determined that the system is in the first operating mode.

18. The method of claim 15, wherein the first operating mode comprises a developer mode and wherein the developer mode allows the system to execute unverified code.

19. The method of claim 15, wherein the system is configured to run in one of the first operating mode and a second operating mode.

20. A non-transitory machine-readable medium comprising instructions stored therein, which when executed by a machine, cause the machine to perform operations comprising:
   executing verified code to perform the steps comprising:
      initializing boot up of the system;
      accessing a developer mode state stored within an internal register to determine whether the system is in developer mode, wherein the developer mode allows the system to execute unverified code while in developer mode;
      instructing the internal register to activate a developer mode indicator when it is determined that the system is allowed to run unverified code, wherein the internal register sends a signal directly to the developer mode indicator to activate the developer mode indicator;
      locking the internal register while the system is allowed to run unverified code when it is determined that the system is allowed to run unverified code, such that the internal register ignores subsequent calls to the internal register, until the system reboots; and
   enabling execution of unverified code to boot the system in the developer mode after locking the internal register, when it is determined that the system is in the developer mode;
   booting the system using verified code when it is determined that the system is not in the developer mode, wherein the system is not allowed to run unverified code when the system is not in developer mode.

21. The non-transitory machine-readable medium of claim 20, wherein the verified code comprises code that has been pre-signed by a trusted party, and wherein unverified code comprises unsigned code.

* * * * *